INVENTOR.
WILLIAM A. PAINE 2ND

Oct. 4, 1960  W. A. PAINE 2ND  2,954,794
ELECTRO-HYDRAULIC SERVO AND INVERTER SYSTEM
Filed Nov. 1, 1955  2 Sheets-Sheet 2

INVENTOR.
WILLIAM A. PAINE 2ND
BY
ATTORNEYS

United States Patent Office 2,954,794
Patented Oct. 4, 1960

2,954,794
ELECTRO-HYDRAULIC SERVO AND INVERTER SYSTEM

William A. Paine 2nd, Seattle, Wash.

Filed Nov. 1, 1955, Ser. No. 544,327

6 Claims. (Cl. 137—84)

This system relates to electro-hydraulic servo systems of a closed loop type whereby a single or differential pressure output is made proportional to a low-level electrical input signal.

Important aims of the invention are to provide a high performance compact system which gives output pressures having a sum equal to a constant so that high differential pressures can be obtained in both directions when the output pressures are applied to opposite sides of a pressure differentially operated device, which is sensitive at low as well as high differential pressure outputs and which has a superior response at high outputs.

Among the concerns of the invention is the control of a slide valve through the use of the back pressure of a nozzle which is supplied from a source of high pressure fluid and has a "flapper" arranged to selectively restrict flow therefrom in response to an input signal. A further object of the invention is to provide a feedback arrangement whereby such a flapper always returns to a given neutral position when the output pressure proportional to the input signal is obtained. The term "flapper" as herein used is not intended to be limited to a pivoted member or to an extension of an armature, but is to include any other member, whether it be pivoted, moved bodily, or having a diaphragm action, etc., as long as it has the flow-restricting function.

With yet additional objects and advantages in view which, with the foregoing, will appear and be understood in the course of the following description and claims, the invention consists in the novel construction and in the adaptation and combination of parts hereinafter described and claimed.

Figure 1:
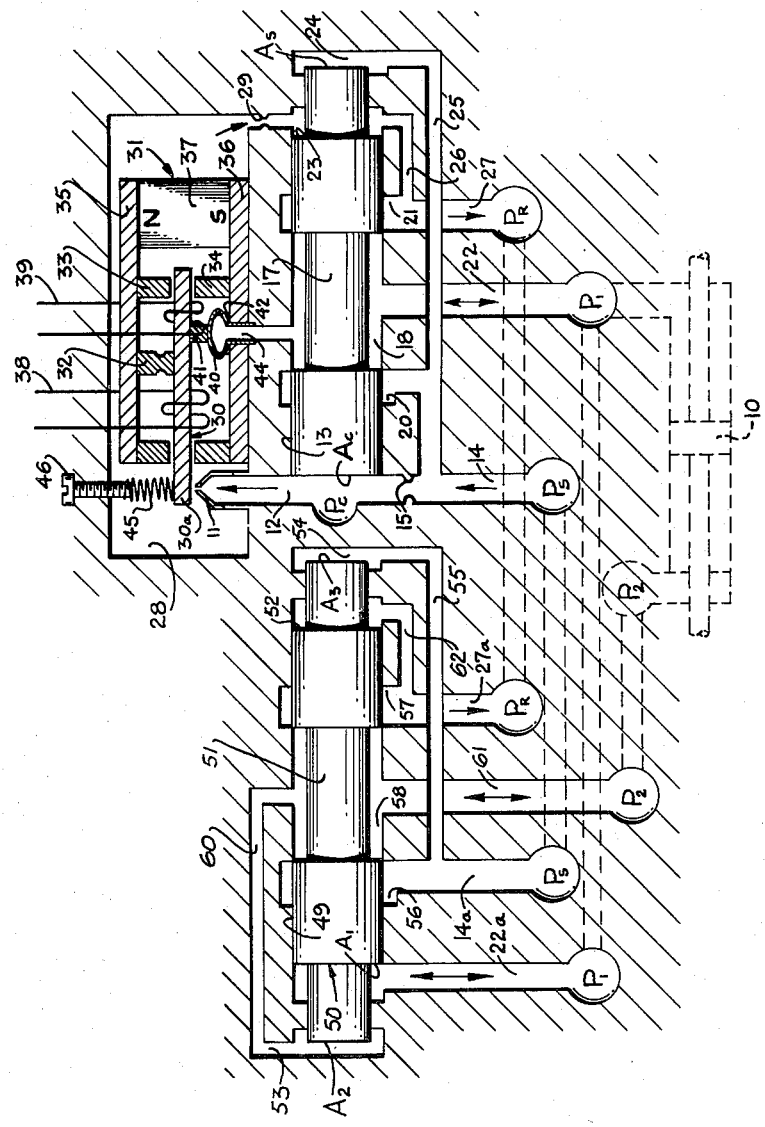
Fig. 1 is a schematic view of the invention and with a possible load in the form of a ram, said ram and the cross-connecting passages between the primary and inverter sections of the invention and those leading to the broken lines.
Figure 2:
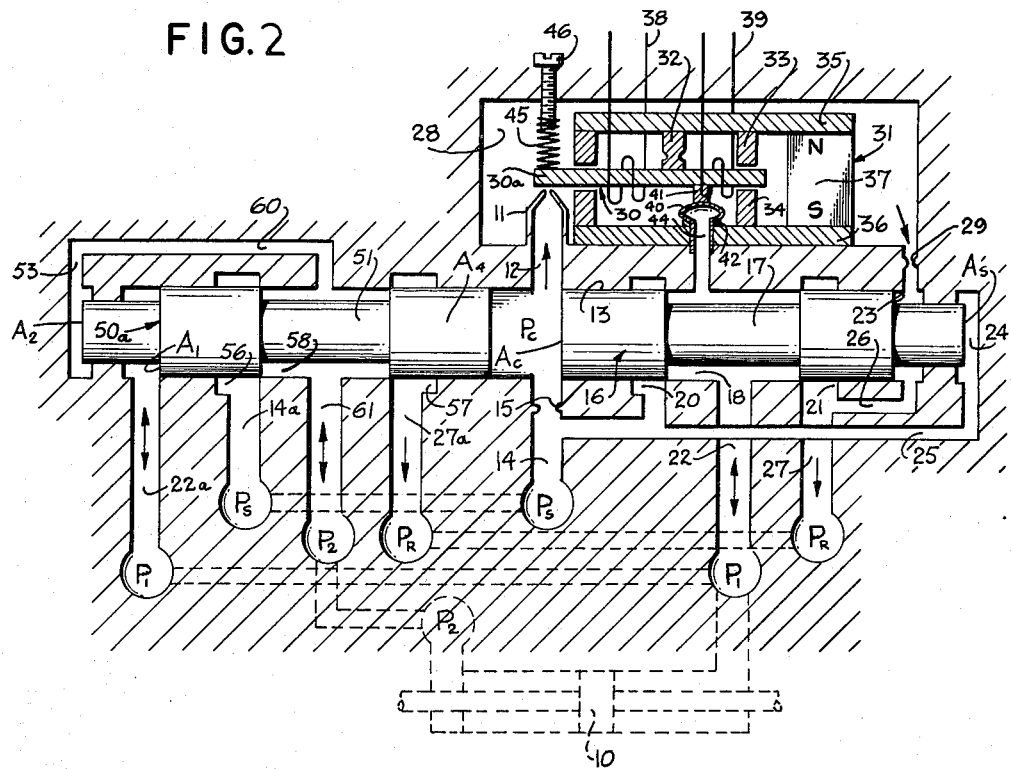
Fig. 2 is a schematic view of the invention with a modified inverter section.
Figure 3:
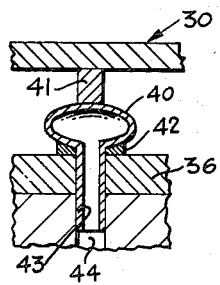
Fig. 3 is an enlarged cross-sectional view of the feedback element.

For a ready understanding of my invention it should be kept in mind that a low powered electrical input signal is converted into a pressure output signal $P_1$, and this output signal is in turn inverted to provide a complementing pressure output signal $P_2$ which is of such a value that the sum of the pressures $P_1$ and $P_2$ equals a constant, and namely a supply pressure $Ps$. The portion of the servo system which converts the electrical input signal into output $P_1$ has been designated the "primary section" and the inversion of $P_1$ to $P_2$, which is illustrated by two alternative devices in Figs. 1–2, is termed an "inverter section." For purposes of example the outputs $P_1$, $P_2$ are shown applied to a hydraulic ram actuator 10. The discharge or return fluid from the primary and inverter sections is denoted $Pr$.

*Primary section*

The supply pressure $Ps$ is reduced to a control pressure $Pc$ by controlling the flow through a nozzle 11 leading from a control chamber 12. This chamber connects with the head of a bore 13 and is fed with supply fluid from a supply passage 14 via a supply orifice 15. A primary slide valve 16 is mounted in the bore 13 and has a reduced center section 17 providing a mixing chamber 18 which selectively connects an output passage 22 with supply and discharge ports 20, 21 comprising annular grooves in the bore 13. The head face of the valve 16 is denoted $Ac$ and is acted upon by $Pc$ whereas the foot end portion of the valve is necked at shoulder 23 to provide a terminal differential area $As$ which is exposed to an end chamber 24. A passage 25 connects this end chamber and the supply port 20 with the supply passage 14. It will be noted that the foot of the bore 13 proper is connected by a drain passage 26 with a discharge passage 27 leading from the port 21 so that fluid pressure cannot build up against the valve shoulder 23.

Flow from the nozzle 11 into a chamber 28 is controlled by a flapper 30a which may be an extension of the armature 30 of a torque motor 31. The fluid discharges from the chamber 28 through a return orifice 29 and into the foot end of the bore proper from whence it can dump via passages 26, 27. It will be noted that the armature 30 is pivoted by means of a hinge 32 mounted midway between the air gaps of two opposed pairs of poles 33, 34. These are supported by respective end plates 35, 36 between which a permanent magnet 37 is clamped. The two coils of the motor are denoted 38, 39 and they are arranged so that application of a differential current thereto causes magnetization of the armature 30. As a result one end of the armature is polarized north and the other south depending on the direction of the differential current. The armature will, therefore, be attracted toward two diagonally opposite of the poles 33, 34 and repelled by the other two poles. These forces of attraction and repulsion result in a rotation of the armature about its hinge 32 and a deflection of the extended flapper end 30a thereof in the vicinity of the nozzle 11. With this arrangement the magnitude of the forces urging deflection of the flapper 30a is proportional to the magnitude of the differential current input signal to the coils 38, 39 and the direction of the motion of the flapper into a more or less restricting position of the nozzle 11 is determined by which of the coils has the larger current.

Armature 30 has three possible torques acting thereon. One is caused by the flow of fluid through the nozzle 11 acting on the flapper portion 30a of the armature. Another is the torque caused by a differential current input to coils 38, 39. The third torque is caused by output pressure $P_1$ acting on a pressure sensitive feedback element which take the form of a tube 40 which is partially collapsed cross-sectionally and is connected by transfer member 41 with the armature near its pivot point. At its lower side tube 40 is seated in a saddle 42 which is secured to the end plate 36. A tube section 43 extends through the latter and the saddle to tube 40 from a feedback passage 44 which leads from chamber 18 in the bore 13. Accordingly, as output $P_1$ rises the pressure sensitive tube 40 tends to distend toward the armature 30 and exerts a proportional feedback force thereon via the transfer member 41. Similarly, when pressure $P_1$ lowers the tube 40 contracts somewhat away from the armature and hence the feedback force to the armature is reduced proportionally to the output pressure drop.

The equilibrium condition of the primary section is adjusted so that the output pressure $P_1$ will equal the control pressure $Pc$ in chamber 12 when the current differential between coils 38, 39 is zero. With the proper size of nozzle 11 the torque produced by nozzle flow force on the flapper will then be equal to the torque produced by the feedback element 40. Minute adjustment of the torque balance of the armature is accomplished by varying the setting of an adjusting screw 46. This regulates the loading of a compression spring 45 which acts on the flapper 30a in opposition to the force exerted thereon by the fluid discharging from the nozzle 11. In this equilibrium condition control pressure $Pc$, and hence output pressure $P_1$, will bear the same ratio to the supply pressure $Ps$ as the area ratio $As:Ac$. Normally this area ratio is chosen to be 1:2 to give a maximum range of output pressure chances both above and below the equilibrium value of $P_1$.

As viewed in the drawings, the slide valve 16 causes fluid to drain from chamber 18 endwise to the right and it causes supply fluid $Ps$ to be added to this chamber to raise $P_1$ when the valve movement is to the left. Since the supply pressure $Ps$ is desirably held constant the valve is acted upon by a constant force toward the left caused by $Ps$ acting on area $As$. This constant force is resisted by the control pressure $Pc$ acting on the area $Ac$, and hence, changes occurring in $Pc$ above or below the equilibrium value of, say, $\frac{1}{2}Ps$, will cause the slide valve to move, respectively, to the right or left causing flows from or to chamber 18 resulting in corresponding decreases or increases in the output pressure $P_1$.

For typical operation with a given differential current setting in the torque motor 31, assume that the slide valve is balanced by forces $PcAc$ and $PsAs$ to the right and left, respectively, and is in a position such that output pressure $P_1$ is equal to control pressure $Pc$. If $P_1$ should then drop in value, the feedback torque exerted by feedback element 40 on the armature 30 would be reduced proportionally thereby causing the armature to turn clockwise about its pivot 32. This would reduce the restriction of the nozzle 11 by the flapper 30a and therefore result in a drop in the control pressure $Pc$ acting on valve area $Ac$. The resultant force unbalance moves the valve to the left allowing flow of fluid from the supply port 20 into chamber 18 and thence to output passage 22 resulting in a pressure increase of output $P_1$. As $P_1$ increases in value the feedback torque also increases causing the armature 30 to turn counterclockwise and brings the flapper end 30a thereof back to its original restricting condition. If $P_1$ should rise in value a reverse operation would occur.

With the primary section again in equilibrium let it be assumed that the differential current input signal to the torque motor changed such as to cause a reduction in the torque input to the armature 30 in the clockwise direction. The flapper 30a would then move away somewhat from the nozzle 11 causing the control pressure $Pc$ to lower and the slide valve 16 to move to the left exposing the supply port 20 to chamber 18. The output pressure $P_1$ then increases until the feedback torque exerted on the armature 30 rises an amount equaling the torque unbalance on the armature caused by the original change in the differential current input signal. At this time the flapper 30a will have moved back into its original nozzle-restricting position resulting in a raising of the control pressure $Pc$ to its original equilibrium value of $\frac{1}{2}Ps$. In the reverse manner a change in the differential current input signal such as to cause an increase in the torque input to the armature in the counterclockwise direction would cause a proportionate drop in the output pressure $P_1$.

Accordingly, it can be seen that since the torque input on the armature 30 is proportional to the current input and the feedback torque is proportional to the output pressure $P_1$, changes in pressure $P_1$ must be proportional to changes in the current applied to the torque motor coils 38, 39. It should be noted that the position of slide valve 16 is dependent upon the flow conditions to and from the load at any particular instant as well as the required output pressure $P_1$. For example, if the load is the ram 10 and flow is taken out of output passage 22 due to ram motion to the left, slide valve 16 will shift to stand to the left of a no flow position to allow $P_1$ to remain at the required value while flow is taken out of the system. Similarly, the slide valve will stand to the right of the no flow position if the ram moves to the right causing reverse flow into the output passage 22.

*Inverter section*

Referring first to the embodiment shown in Fig. 1, it is seen that such has a bore 49 with a slide valve 50 which is by coincidence similar in shape to valve 16 in that it has a reduced center section 51, a shoulder 52, and differential $A_3$ at the foot end corresponding, respectively, to 17, 23, and $As$ of valve 16. The difference in shape between the valves occurs at the head end in that valve 50 is necked to provide differential areas $A_1$ and $A_2$ which normally are selected equal to each other and to area $A_3$. Areas $A_2$ and $A_3$ are exposed to front and foot chambers 53, 54, and the latter connects by passage 55 with a supply passage 14a leading to a supply port 56. This port and the port 57 of a discharge passage 27a are angular grooves in the bore 49 and are spaced apart a distance corresponding to the length of valve section 51. The bore chamber surrounding the valve section is numbered 58 and connects by a passage 60 with front chamber 53 to supply output fluid $P_2$ thereto. An output or load passage 61 leads from bore 49 between the ports 56, 57. The foot of bore 49 has a drain passage 62 connecting with the discharge passage 27a so that pressure cannot build up against shoulder 52.

The output $P_1$ of the primary section becomes the input to the inverter and is fed through passage 22a to the head end of bore 49 so that it will act against area $A_1$. At this point it will be well to note that since $A_1$ and $A_2$ are equal, passages 22a and 60 can be switched so that passage 22a leads to the front chamber 53 and chamber 60 feeds to the head of the bore. In either case, for balancing of valve 50 the sum of pressures $P_1$ and $P_2$ must equal supply pressure $Ps$ since areas $A_1$, $A_2$ and $A_3$ are all equal. For maximum sensitivity the same supply source should be used for the inverter and primary sections so that both will be effected equally by any fluctuations in the supply pressure $Ps$. For the same reason it is desirable that areas $A_3$ and $As$ be equal. The inverter of Fig. 1 can be placed in the same or a separate body from that of the primary section and in the former instance particular compactness can be achieved as by placing the slide valves 16, 50 in alinement with the areas $As$, $A_3$ faced toward one another in a single chamber consisting of a merger of chambers 24, 54.

In the inverter embodiment of Fig. 2 the foot end of the modified slide valve, denoted 50a, has been altered to expose a valve area $A_4$ equaling the full cross-section of the bore. This valve area is supplied with control fluid $Pc$, and a particularly compact arrangement can be made by alining the valves 16 and 50a in a common bore with the areas $Ac$ and $A_4$ facing one another. Accordingly, passages 55, 62 and foot chamber 54 of the Fig. 1 embodiment are eliminated, but in all other respects the two inverters are identical so that the same identifying numerals have been applied thereto. When pressure $Pc$ equals $\frac{1}{2}Ps$ in the equilibrium condition of the primary section, there is no required relationship between the areas of inverter valve 50a and the primary section valve 16 because then the sum of forces $P_1A_1$ and $P_2A_2$ will always equal $\frac{1}{2}PsA_4$ when the system is balanced. Accordingly, the sum of pressures $P_1$ and $P_2$ will equal supply pressure $Ps$ since $A_1$ and $A_2$ each equal $\frac{1}{2}A_4$.

However, maximum sensitivity can be expected when area $A_4$ is made equal to area $Ac$ and this relationship must be held if control pressure $Pc$ does not equal $\frac{1}{2}Ps$ when primary valve 16 is balanced. In this latter instance the force equation for inverter valve 50a is $P_1A_1$ plus $P_2A_2$ equals $PcA_4$, and since the force equation for primary valve 16 is $PcAc$ equals $PsAs$ and $Ac$ equals $A_4$, the inverter equation can be converted to $P_1A_1$ plus $P_2A_2$ equals $PsAs$ and results in $P_1$ plus $P_2$ equals $Ps$ since areas $A_1$, $A_2$ and $As$ are all equal in the example.

It is thought that the invention and its advantages will have been clearly understood from the foregoing detailed description of the preferred illustrated embodiments. Minor changes in the details of construction may be resorted to without departing from the spirit of the invention and it is therefore my intention that no limitations be implied and that the hereto annexed claims be given the broadest interpretation to which the employed language fairly admits.

What I claim is:

1. In a pressure control system, a supply of fluid under a supply pressure, and a discharge reservoir, primary and inverter slide valves operatively associated with said supply and discharge and each arranged to alternately throttle said supply and discharge by endwise movement and thereby obtain primary and inverter output pressures, two differential areas formed at one end of the inverter valve and each acted upon by a respective one of said output pressures, a differential area formed at one end of the primary valve and acted upon by said supply pressure, and pressures derived from said supply and acting on the other ends of said valves to balance the valves at endwise positions whereat said output pressures are obtained, said output pressures being in such a relation that their sum equals a constant and being applied to opposite sides of a pressure differentially operated device.

2. In a pressure control system, a supply of fluid under a supply pressure, and a discharge reservoir, primary and inverter sections each having a bore with supply and discharge ports and an output port therebetween, said sections also having within said bores primary and inverter slide valves, respectively, each arranged to throttle the respective said supply and discharge ports for obtaining primary and inverter output pressures at their respective said output ports, two differential areas formed at one end of the inverter valves and each communicating with a respective one of said output ports, a differential area formed at one end of the primary valve and communicating with said supply, and pressure fluid derived from said supply and acting on the other ends of said valves to balance the valve at endwise positions whereat said output pressures are obtained, said output pressures being in such a relation that their sum equals a constant and being applied to opposite sides of a pressure differentially operated device.

3. The system of claim 2 in which said two differential areas are equal.

4. In a pressure control system, a supply of fluid under a supply pressure, and a discharge reservoir, primary and inverter slide valves operatively associated with said supply and discharge and each arranged to alternately throttle said supply and discharge by endwise movement and thereby obtain primary and inverter output pressures, two differential areas formed at one end of the inverter valve and each acted upon by a respective one of said output pressures, a differential area formed at one end of the primary valve and acted upon by said supply pressure, a control chamber having its fluid pressure acting upon the other ends of the primary and inverter valves and communicating via a supply orifice with said supply, and means for varying the pressure in said chamber by the rate of flow of supply fluid therefrom, said output pressures being in such a relation that their sum equals a constant and being applied to opposite sides of a pressure differentially operated device.

5. The system of claim 4 in which all of said differential areas are equal in area.

6. In a pressure control system, a supply of fluid under a supply pressure, and a discharge reservoir, primary and inverter slide valves operatively associated with said supply and discharge and each arranged to alternately throttle said supply and discharge by endwise movement and thereby obtain primary and inverter output pressures, two differential areas formed at one end of the inverter valve and each acted upon by a respective one of said output pressures, a differential area formed at one end of the primary valve and acted upon by said supply pressure, a control chamber exposed to one end of the primary valve and communicating via a supply orifice with said supply, means for varying the pressure in said chamber by the rate of flow of supply fluid therefrom, and a differential area formed at the other end of the primary valve and acted upon by said supply pressure, said output pressures being in such a relation that their sum equals a constant and being applied to opposite sides of a pressure differentially operated device.

References Cited in the file of this patent

UNITED STATES PATENTS

| | | |
|---|---|---|
| 1,966,841 | Zelov | July 17, 1934 |
| 2,582,088 | Walthers | Jan. 8, 1952 |
| 2,615,466 | Garde | Oct. 28, 1952 |
| 2,625,136 | Moog | Jan. 13, 1953 |
| 2,635,618 | Moore | Apr. 21, 1953 |
| 2,652,066 | Bowditch | Sept. 15, 1953 |
| 2,709,421 | Avery | May 31, 1955 |
| 2,724,398 | Higgins | Nov. 22, 1955 |
| 2,731,024 | Williams | Jan. 17, 1956 |
| 2,790,427 | Carson | Apr. 30, 1957 |
| 2,832,318 | Paine | Apr. 29, 1958 |